United States Patent [19]

Barber et al.

[11] Patent Number: 5,758,910
[45] Date of Patent: *Jun. 2, 1998

[54] GASKET ASSEMBLY FOR A FLUID COUPLING

[75] Inventors: Patrick P. Barber, Kinnelon; Lewis L. Aldridge, Parsippany-Troy Hills Township, both of N.J.

[73] Assignee: Parker-Hannifin Corporation, Cleveland, Ohio

[*] Notice: The term of this patent shall not extend beyond the expiration date of Pat. No. 5,673,946.

[21] Appl. No.: 777,554

[22] Filed: Dec. 30, 1996

Related U.S. Application Data

[63] Continuation of Ser. No. 499,790, Jul. 7, 1995, Pat. No. 5,673,946.

[51] Int. Cl.$^6$ ...................................... F16L 19/03
[52] U.S. Cl. .................. 285/328; 285/379; 285/910; 285/917; 285/330; 277/187; 277/136
[58] Field of Search .................. 285/328, 330, 285/379, 910, 917; 277/182, 189, 136, 166, 187

[56] References Cited

U.S. PATENT DOCUMENTS

| | | |
|---|---|---|
| 949,658 | 2/1910 | Randall. |
| 1,133,320 | 3/1915 | Rockwood. |
| 1,917,553 | 7/1933 | Scholtes. |
| 2,041,136 | 5/1936 | Klingner. |
| 2,292,216 | 8/1942 | Doran. |
| 2,462,762 | 2/1949 | Nardin. |
| 2,466,527 | 4/1949 | Wolfram. |
| 2,619,357 | 1/1952 | Montgomery. |
| 3,080,171 | 3/1963 | Booth. |
| 3,139,294 | 6/1964 | Richards, Jr.. |
| 3,262,722 | 7/1966 | Gastineau. |
| 3,275,348 | 9/1966 | Scott. |
| 3,298,719 | 1/1967 | Bills et al.. |
| 3,332,709 | 7/1967 | Kowalski. |
| 3,521,910 | 7/1970 | Callahan, Jr. et al.. |
| 3,695,640 | 10/1972 | Clague. |
| 4,213,618 | 7/1980 | Thurber. |
| 4,540,205 | 9/1985 | Watanabe et al.. |
| 4,552,389 | 11/1985 | Babuder et al.. |
| 4,570,981 | 2/1986 | Fournier et al.. |
| 4,650,227 | 3/1987 | Babuder et al.. |
| 4,685,707 | 8/1987 | Miyashita. |
| 4,838,583 | 6/1989 | Babuder et al.. |
| 4,854,597 | 8/1989 | Leigh. |
| 5,060,987 | 10/1991 | Miller. |
| 5,066,051 | 11/1991 | Weigl et al.. |
| 5,135,269 | 8/1992 | Babuder. |
| 5,145,219 | 9/1992 | Babuder. |
| 5,163,721 | 11/1992 | Babuder. |
| 5,299,843 | 4/1994 | Weigl et al.. |

FOREIGN PATENT DOCUMENTS

| | | |
|---|---|---|
| 651733 | 11/1962 | Canada. |
| 0 514 793 A1 | 11/1992 | European Pat. Off.. |
| 0 566 980 A1 | 10/1993 | European Pat. Off.. |
| 0 567 924 A1 | 11/1993 | European Pat. Off.. |
| 984093 | 11/1951 | France. |
| 440 727 | 2/1927 | Germany. |
| 921 903 | 11/1955 | Germany. |
| 27 38 244 | 3/1979 | Germany. |
| 1 775 199 | 7/1991 | Germany. |
| 5-141576 | 6/1993 | Japan. |
| 783397 | 9/1957 | United Kingdom. |
| 1163710 | 3/1968 | United Kingdom. |
| 1167680 | 7/1968 | United Kingdom. |

*Primary Examiner*—Terry Lee Melius
*Assistant Examiner*—Heather Shackelford
*Attorney, Agent, or Firm*—Anthony J. Casella; Gerald E. Hespos; Ludomir A. Budzyn

[57] ABSTRACT

A gasket assembly is provided for fluid couplings. The gasket assembly includes a gasket having an outer circumferential surface including arc segments defining a minor outside diameter and a plurality of ears projecting outwardly from the arc segments to define a major outside diameter for the gasket. The gasket assembly further includes a split cylindrical sleeve having a plurality of slots disposed and dimensioned for loosely receiving the ears of the gasket. The sleeve and the gasket are dimensioned such that the ears project outwardly beyond the tube to define gripping protrusions that facilitate mounting and removal of the gasket assembly onto the coupling component.

10 Claims, 6 Drawing Sheets

PRIOR ART

GASKET ASSEMBLY FOR A FLUID COUPLING

This application is a continuation of application Ser. No 08/499,790 filed Jul. 7, 1995 which application is now U.S. Pat. No. 5,673,946.

BACKGROUND OF THE INVENTION

1. Field of the Invention

The subject invention relates to an apparatus for loosely trapping a metallic gasket and for enabling efficient mounting and removal of the gasket relative to one component of a fluid coupling.

2. Description of the Prior Art

Many industrial processes require the presence of a specified gas. The gas is transported through a system of tubes to appropriate locations in an industrial facility. The system of tubes includes couplings that periodically may be disconnected and reconnected. Any coupling used for these purposes must prevent leakage in either direction. In particular, the coupling must prevent an in-flow of ambient air that could affect the purity of the gas being transported. Similarly, many gases are harmful or combustible, and thus the coupling must prevent an out-flow of the gas into the surrounding environment.

Figure 1:
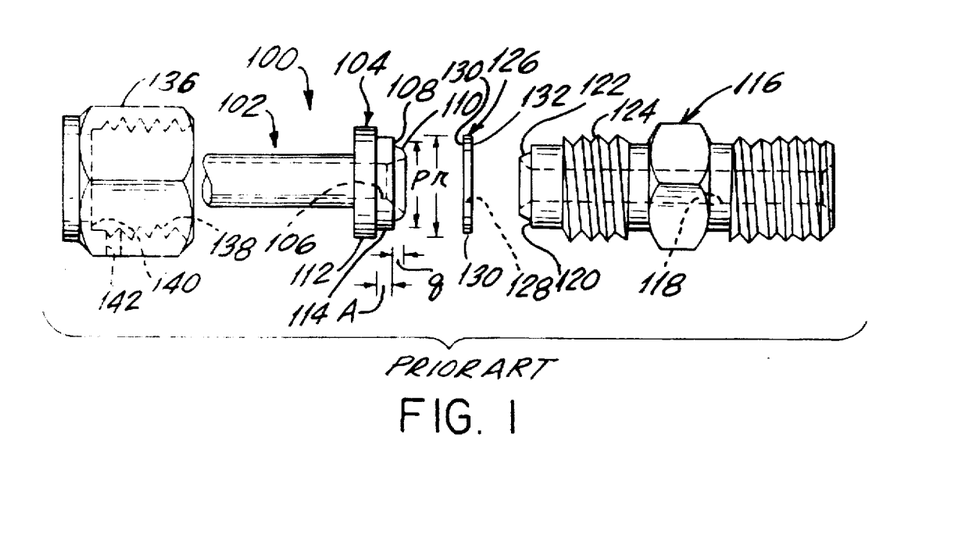
FIG. 1 is an exploded cross-sectional view of a prior art fluid coupling.

A typical prior art coupling for high pressure gas is shown in FIG. 1 and is identified generally by the numeral 100. The prior art coupling 100 includes a first coupling component 102 having a mating end 104, an opposed end (not shown) and a cylindrical gas passage 106 extending axially therebetween. The mating end 104 has a radially extending planar end face 108. An annular sealing bead 110 of outside diameter "p" concentrically surrounds the gas passage 106, and projects a distance "q" from the planar end face 108. The mating end 104 further includes a shoulder 112 facing the opposed end of the coupling component 102. A cylindrical surface 114 of diameter "r" and length "s" extends between the end face 108 and the shoulder 112.

The prior art coupling 100 further includes a second coupling component 116 with a gas passage 118 extending axially therethrough. The second coupling component 116 includes a radially aligned planar end face 120. An annular sealing bead 122 projects from the end face 120 and surrounds the gas passage 118. External threads 124 are formed around the second coupling component 116 in proximity to the end face 120.

The prior art coupling 100 further includes a metallic gasket 126 intermediate the first and second coupling components 102 and 116. The gasket 126 includes inner and outer circumferential surfaces 128 and 130 respectively and opposed sealing faces 132 and 134. The outer circumferential surface 130 has a diameter approximately equal to the diameter "r" of the cylindrical surface 114 on the first coupling component 102.

The prior art coupling 100 also includes a nut 136 having an array of internal threads 138. The nut 136 also includes an inwardly extending annular flange 140 surrounding the tubular body of the first coupling component 102 and dimensioned to engage the shoulder 112 of the first coupling component 102. Threaded tightening of the nut 136 with the threads 124 on the second coupling component 116 urges the sealing beads 110 and 122 into tight sealing engagement with the opposed faces 132 and 134 of the prior art gasket 126. A probe hole 142 extends radially through the nut 136 to permit leak testing of the connection.

Prior art couplings take many other forms with structural and functional similarities to the prior art coupling 100 shown above. For example, some prior art couplings have two components identical to the first coupling component 102 of FIG. 1. Male and female nuts urge the sealing beads of these identical components into sealing engagement with the gasket.

The prior art coupling 100 shown in FIG. 1 is widely used in the compressed gas industry and is very effective for high purity gas flow systems. However, proper alignment of the gasket 126 can be difficult due to the small sizes of the components and the inaccessibility of the end faces during mating. An improperly aligned gasket can affect the integrity of the seal in the coupling. Improperly aligned gaskets also can generate wear debris as coupling components and the gasket slide relative to one another.

The prior art includes several gasket retainers that are intended to positively locate the gasket in a fixed position on the coupling components so that the sealing beads of the coupling components engage substantially the same portions of the gasket during subsequent disassembly and reassembly of the coupling. For example, U.S. Pat. No. 4,552,389 to Babuder et al. shows a coupling similar to the prior art coupling depicted in FIG. 1 above. The coupling of U.S. Pat. No. 4,552,389 further includes a gasket retainer having a cylindrical wall dimensioned to surround the outer circumference of the prior art gasket depicted in FIG. 1. A planar wall projects inwardly from one end of the cylindrical wall for engaging an outer circumferential region on one planar face of the prior art gasket. A plurality of legs extend axially from the opposed end of the cylindrical wall for gripping the coupling component. As noted above, the retainer shown in U.S. Pat. No. 4,552,389 is intended to prevent movement of the gasket relative to the gasket retainer and either coupling component during each disconnection and subsequent reconnection of the coupling.

The retainer of U.S. Pat. No. 4,552,389 offers certain undesirable features. For example, the fixed positioning intended by the retainer requires close manufacturing tolerances. Too tight a gripping can deform the small gasket. Too tight a fit also could prevent complete seating of the gasket and could lead to improper seating of the gasket or the retainer in the coupling, with a corresponding risk of leaks. These potential problems can be overcome by adequate quality control. However additional quality control can increase costs. Additionally, a continuous cylindrical side wall has the potential for masking leaks that would otherwise be detected during the helium leak testing carried out in high purity gas systems prior to actual use of the system. Another drawback relates to actual manipulation of the retainer. The ultra-clean environment in which these gaskets are used requires technicians to wear gloves. The very small gasket retainer shown in U.S. Pat. No. 4,552,389 is difficult to manipulate with gloves for either mounting the gasket onto a coupling component or removing the gasket between successive disconnections and reconnections of a coupling.

U.S. Pat. No. 4,838,583 also issued to Babuder et al. and shows a retainer with a split end wall for engaging one mating face of a gasket, and a split cylindrical side wall for engaging both an outer circumference of the gasket and an outer circumferential surface of a coupling component. As in the previously described U.S. Pat. No. 4,552,389, the retainer disclosed in U.S. Pat. No. 4,838,583 is intended to positively locate the gasket and hold the gasket such that the sealing beads engage substantially the same portions of the associated gasket face during subsequent disassembly and reassembly of the coupling. The retainer shown in U.S. Pat.

No. 4,838,583 suffers from the deficiencies described with respect to U.S. Pat. No. 4,552,389. For example, the retainer shown in U.S. Pat. No. 4,838,583 is difficult to manipulate for mounting or removing a gasket from a coupling component. Furthermore the retainer shown in U.S. Pat. No. 4,838,583 requires the gasket and the coupling component to have very nearly identical outside diameters. If the gasket is slightly larger than the coupling component, the retainer will expand to the diameter of the gasket and will not adequately grip the coupling component. If the gasket is slightly too small, one end of the retainer may expand more than the other. This conical deflection may exert excessive inward forces on the gasket and may urge the gasket into a nonplanar shape.

Still another gasket retainer is shown in U.S. Pat. No. 5,163,721 which issued to Babuder. The retainer in U.S. Pat. No. 5,163,721 is intended for a gasket having notches in its outer circumference. The gasket retainer includes a cylindrical collar and legs dimensioned and disposed for engaging the notches of the gasket. The legs of the retainer are slid into the notches of the gasket and are then folded inwardly to grip the gasket against the cylindrical collar. The post-assembly manufacturing steps to bend the legs represents a manufacturing inconvenience that adds to the total cost and can potentially damage the gasket.

German Patent No. 440,727, dated Mar. 30, 1926 shows a cylindrical sleeve dimensioned to telescope on a portion of a coupling component and to surround the outer circumference of an O-ring. This design would be difficult to manufacture and use with a flat metallic gasket. In particular, very close tolerances would have to be maintained between the outside diameter of the coupling member, the inside diameter of the cylindrical retaining sleeve and the outside diameter of the flat metallic gasket. Furthermore, the German reference provides no structure for controlling the axial positioning of the O-ring relative to the retainer. Still further, the retainer of the German reference would not permit safe leak testing. In this regard, high purity systems are tested for leaks by tightly wrapping each coupling in plastic, and then filling the space between the plastic and the coupling with helium. An end of the system is then connected to a vacuum pump with means for detecting trace amounts of helium that might leak through the seals at the couplings. The cylindrical sleeve retainer of the German reference would be drawn tight to the coupling component by the vacuum, and thus could mask a leak. However, during normal use, the coupling would be subjected to high positive pressure that would permit or encourage leakage between the cylindrical sleeve and the coupling.

In view of the above, it is an object of the subject invention to provide a gasket assembly for efficiently mounting and removing the gasket from at least one component of a fluid coupling.

It is another object of the subject invention to provide a gasket assembly for a fluid coupling wherein the assembly is inexpensive and easy to manufacture.

It is a further object of the subject invention to provide a gasket assembly that can be formed entirely from metallic materials that are inert to gases flowing through the fluid coupling.

Another object of the subject invention is to provide a gasket assembly that does not mass leaks during tests performed prior to actual usage of the apparatus.

SUMMARY OF THE INVENTION

The subject invention is directed to a gasket assembly for efficiently mounting a gasket onto a component of a fluid coupling and for efficiently removing the gasket from the component. The gasket assembly of the subject invention may be used with a prior art fluid coupling, such as the prior art fluid coupling illustrated in FIG. 1 and described above.

The gasket assembly may include a gasket unitarily formed from a metallic material and having opposed sealing faces. The sealing faces may be planar and parallel to one another. Alternatively the sealing faces may have annular self-centering groves that seat with the sealing beads on the coupling. The gasket further includes a central aperture passing therethrough and extending between the opposed sealing faces. The aperture through the gasket may be circular and may define a diameter approximately equal to the inside diameter of the sealing beads on the fluid coupling with which the gasket assembly is employed.

The gasket includes circularly or cylindrically generated outer edges which define arc segments that are concentric with the aperture through the gasket. The outer circular or cylindrical arc segments of the gasket may define a minor outside diameter for the gasket approximately equal to or slightly less than the outside diameter of the coupling component with which the gasket assembly is employed. The gasket further includes a plurality of ears projecting outwardly from locations intermediate the circular or cylindrical arc segments of the gasket. For example, two ears spaced approximately 180° apart or three ears spaced approximately 120° apart may be provided. The ears define the major outside diameter for the gasket and may be in the plane of the sealing faces or offset therefrom.

The gasket assembly may further include a generally tubular sleeve unitarily formed from a resilient metallic material. The sleeve includes opposed first and second longitudinal ends, and a slit extending therebetween. The split sleeve, in an unbiased condition, defines an inside diameter approximately equal to or slightly greater than the minor outside diameter measured between opposed arc segments on the gasket. The inside diameter of the unbiased sleeve also is approximately equal to or slightly less than the outside diameter of at least one coupling component of the fluid coupling with which the gasket assembly is used.

The tubular sleeve further is formed with a plurality of circumferentially extending slots at a selected location intermediate the first and second ends of the sleeve. The slots preferably are equal in number to the ears on the gasket and are disposed in circumferentially spaced relationship corresponding to the spacing between the ears on the gasket. Each circumferentially extending slot on the tubular sleeve is disposed and dimensioned to receive a corresponding ear on the gasket in loose fitting relationship. Thus, the gasket may be mounted within the tubular sleeve such that the inner circumference of the tubular sleeve is disposed in surrounding relationship to arc segments of the gasket intermediate the ears, and such that the ears project loosely into and/or through the circumferential slots of the tubular sleeve. With these respective dimensions, some axial or rotational movement of the gasket within the tubular sleeve is permitted, but the tubular sleeve substantially traps the gasket. Thus, axially generated forces on the tubular sleeve will be transmitted to the gasket and axially generated forces on the gasket will be transmitted to the tubular sleeve.

The tubular sleeve may be formed from a metallic material that has a thickness less than the radial projection of each ear on the gasket. Thus, each ear on the gasket may project radially beyond the outer circumferential surface of the tubular sleeve. With these relative dimensions, the ears of the gasket may perform a dual function of trapping the gasket within the tubular sleeve and defining a digitally engageable structure projecting radially beyond the outer surface of the tubular sleeve and facilitating mounting or removal of the gasket assembly relative to the coupling. Even if the ears do not project beyond the outer circumference of the sleeve, the relatively large dimensions of the slots facilitate digital manipulation of the gasket assembly.

The gasket assembly of the subject invention may be employed by resiliently expanding the tubular sleeve and simultaneously inserting the gasket therein. The gasket and the tubular sleeve are rotated relative to one another such that the ears on the gasket are aligned with the slots on the tubular sleeve. Sufficient axial movement of the gasket into the tubular sleeve will position the ears into the slots of the tubular sleeve. The tubular element may then be permitted to resiliently contract into an unbiased condition such that the ears of the gasket are loosely trapped within the slots of the sleeve. This loose engageability does not require close manufacturing tolerances.

If the gasket is planar, the sealing faces lie between opposed ends of the sleeve. If, on the other hand, the ears are offset from the sealing faces, one sealing face may be flush with or project beyond the end of the sleeve. This latter embodiment permits zero clearance assembly as explained herein.

The gasket assembly may be used with a fluid coupling by urging an end of the tubular sleeve onto one coupling component. The above described relative dimensions of the tubular sleeve and the coupling component enable the sleeve to resiliently grip the corresponding coupling component. Expansion of the tubular sleeve generated during this mounting of the gasket assembly onto the coupling component will not affect the loosely trapped disposition of the gasket relative to the sleeve. Additionally, this expansion will not cause any potentially deforming forces to be exerted on the gasket. The relative dimensions of the tubular sleeve and the coupling component ensure that the gasket is positioned approximately concentrically with the sealing beads on the axial ends of the coupling components as the coupling components are being urged toward one another by a nut or other such coupling structure.

Fluid couplings periodically must be disconnected, and reconnected. The convention in this industry is to discard the relatively inexpensive gasket after each disconnection and to use a new gasket during each reconnection. The gasket assembly of the subject invention can be easily removed by merely exerting an axial force in the appropriate removal direction. These axial forces on the gasket assembly are facilitated by the radial projection of the ears beyond the outer circumference of the tubular sleeve and/or by the circumferential discontinuity created by the slots.

In all embodiments, the relatively loose capturing of the gasket by the sleeve enables the gasket to expand radially outwardly as the coupling components are tightened against the sealing faces of the gasket. This ability to expand radially improves sealing effectiveness. Additionally the loose engagement of the ears in the slots greatly facilitates assembly of the gasket and sleeve.

DETAILED DESCRIPTION OF THE PREFERRED EMBODIMENTS

Figure 2:
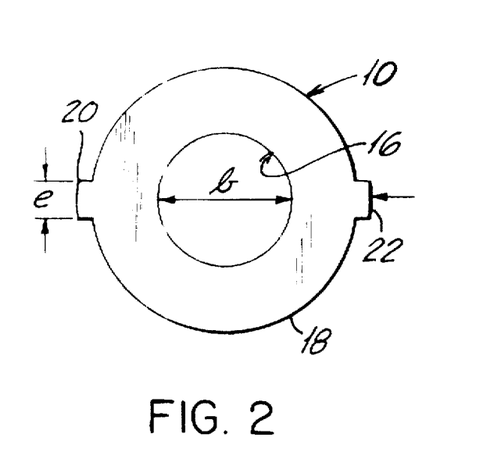
FIG. 2 is a top plan view of a gasket in accordance with the subject invention.
Figure 3:
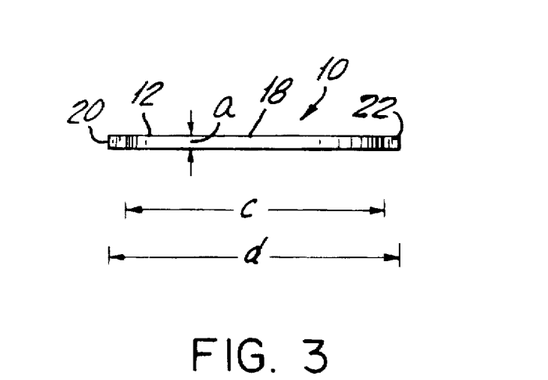
FIG. 3 is a side elevational view of the gasket shown in FIG. 2.
Figure 4:
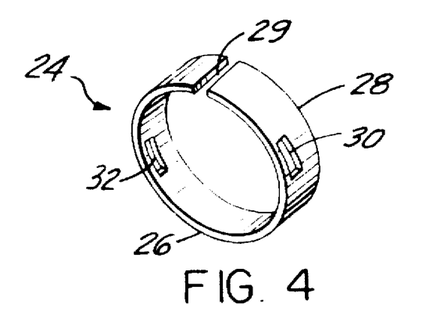
FIG. 4 is a perspective view of a split cylindrical sleeve in accordance with the subject invention.
Figure 5:
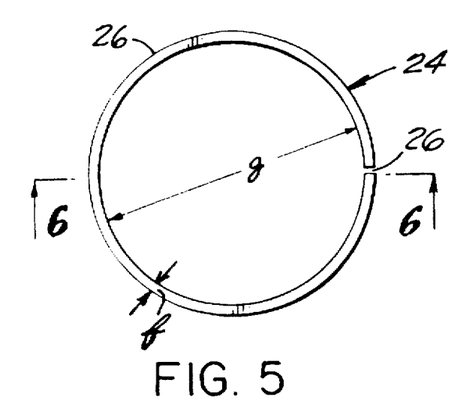
FIG. 5 is an end elevational view of the sleeve shown in FIG. 4.
Figure 6:
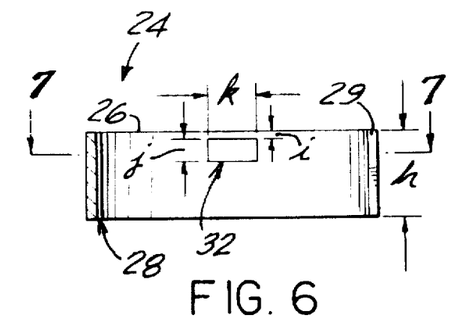
FIG. 6 is a cross-sectional view taken along line 6—6 in FIG. 5.
Figure 7:
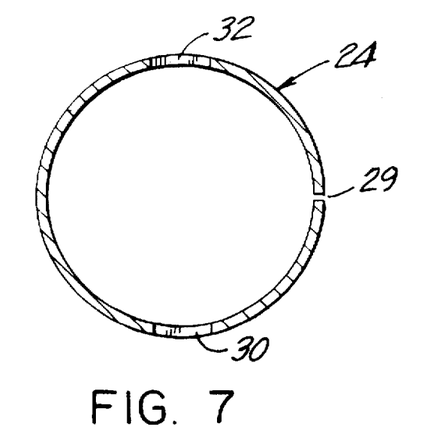
FIG. 7 is a cross-sectional view taken along line 7—7 in FIG. 6.

A gasket in accordance with the subject invention is identified generally by the numeral 10 in FIGS. 2 and 3. The gasket 10 can be employed with the prior art coupling 100 of FIG. 1 or other similar couplings. The gasket 10 is unitarily formed from a metallic material that exhibits good sealing properties. Preferably the gasket 10 is formed from nickel. As shown in FIG. 3, the gasket 10 includes opposed first and second sealing faces 12 and 14 defining a thickness "a" of approximately 0.03 inch. The gasket 10 is generally annular and includes a circular central aperture 16 extending between the first and second sealing faces 12 and 14. The central aperture 16 defines an inside diameter "b" which may be equal to approximately 0.240 inch. The gasket 10 further includes outer arc segments 18 that are substantially circularly generated and concentric with the aperture 16 around a major portion of the gasket 10. The circularly generated arc segments of the outer circumferential surface 18 define a minor outside diameter "c" which may be equal to approximately 0.462±0.002 inch. The outer circumference of the gasket 10 is characterized by a pair of ears 20 and 22 at diametrically opposed locations on the gasket 10 and projecting outwardly. The ears 20 and 22 define a major outside diameter "d" for the gasket 10 as shown most clearly in FIG. 3. The ears 20 and 22 further define a width "e" as shown in FIG. 2.

The gasket assembly of the subject invention further includes a sleeve 24 shown most clearly in FIGS. 4–7. The sleeve 24 is formed from a resilient metallic material of thickness "f". The sleeve 24 is substantially cylindrically generated and, in an unbiased condition, defines an inside diameter "g" which is equal to or slightly greater than the minor diameter "c" of the gasket 10, but less than the major diameter "d" defined by the ears 20 and 22 of the gasket 10. The sleeve 24 includes opposed longitudinal ends 26 and 28 defining a length "h" for the tube 24 as shows in FIG. 6. The sleeve 24 is further characterized by a continuous slit 29 extending longitudinally between the ends 26 and 28. The slit 29 enables the sleeve 24 to be circumferentially expanded to define an inside diameter that is equal to or slightly greater than the major diameter "d" defined by the ears 20 and 22 of the gasket 10.

The sleeve 24 is further characterized by a pair of slots 30 and 32 disposed at diametrically opposed locations and spaced a distance "i" from the end 26 of the tube 24. Each slot 30 and 32 defines an axial dimension "j" which is greater than the thickness "a" of the gasket 10. Additionally, each slot 30 and 32 defines a width "k" which is greater than the width "e" of the ears 20 and 22. Thus, the slots 30 and 32 are dimensioned to loosely receive the ears 20 and 22.

Figure 8:
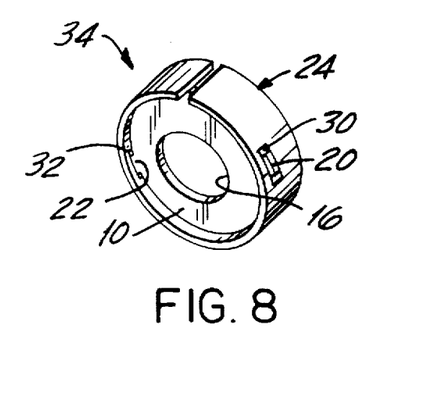
FIG. 8 is a perspective view of a gasket assembly in accordance with the subject invention.
Figure 9:
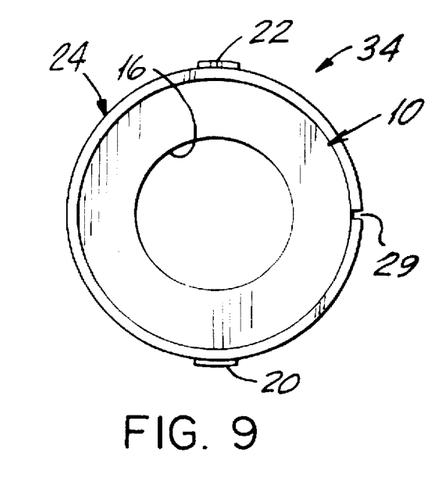
FIG. 9 is an end elevational view of the gasket assembly shown in FIG. 8.
Figure 10:
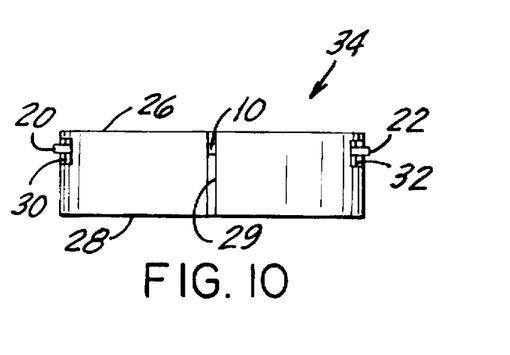
FIG. 10 is a front elevational view of the gasket assembly shown in FIGS. 8 and 9.

The gasket 10 can be mounted into the sleeve 24 to form a gasket assembly 34 as shown in FIGS. 8–10. More particularly, the sleeve 24 can be circumferentially expanded to define an inside diameter equal to or slightly greater than the major diameter "d" defined by the ears 20 and 22 of the gasket 10. The gasket 10 is then slid axially into an end 26 or 28 of the sleeve 24 and the ears 20 and 22 are aligned with the respective slots 30 and 32. The sleeve 24 is then permitted to resiliently return to an unexpanded condition such that the ears 20 and 22 are loosely received in the slots 30 and 32. As noted above, the unexpanded inside diameter "g" of the sleeve 24 is approximately equal to or slightly greater than the minor diameter "c" of the gasket 10. However, the major diameter "d" of the gasket 10 is greater than the inside diameter "g" of the sleeve 24 plus twice the thickness "f" of the metal material from which the sleeve 24 is made (d>g+2f). As a result, the ears 20 and 22 will project diametrically beyond the outer circumference of the sleeve 24, as shown most clearly in FIGS. 9 and 10, and define gripping protrusions that facilitate manipulation of the gasket assembly 34.

Figure 11:
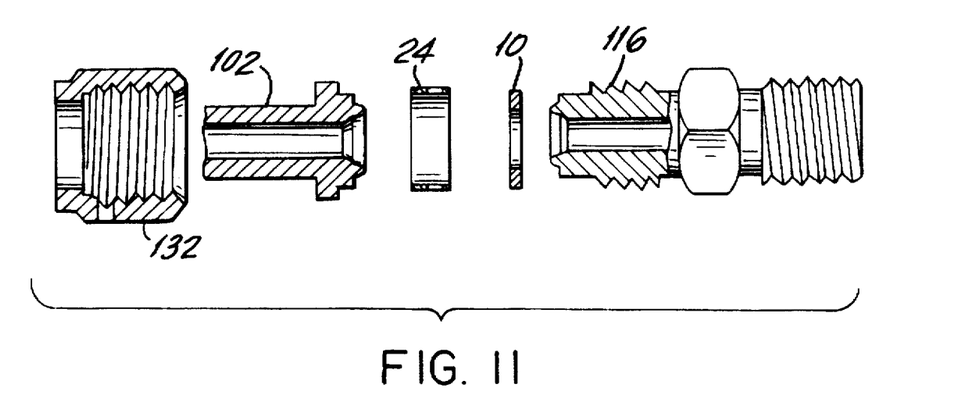
FIG. 11 is an exploded cross-sectional view of a fluid coupling including the gasket assembly of the subject invention.
Figure 12:
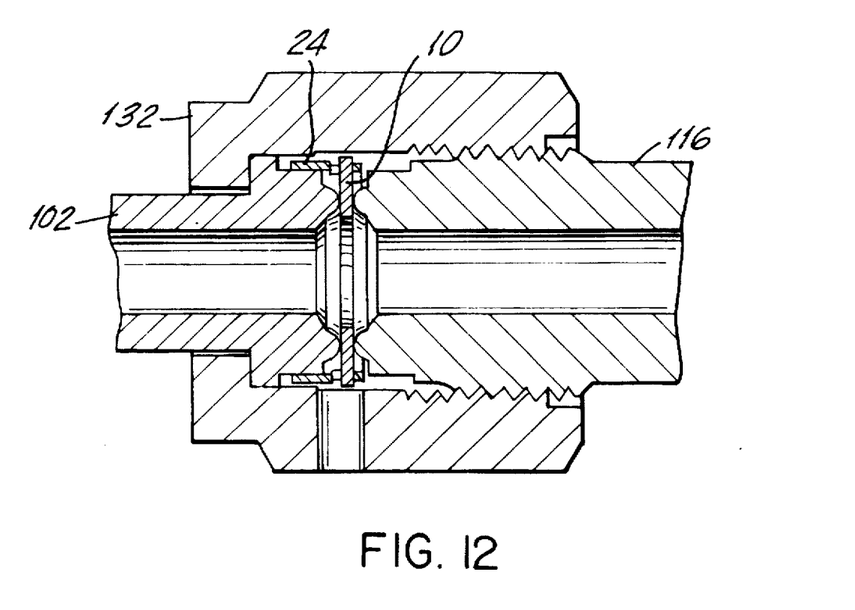
FIG. 12 is a cross-sectional view of the assembled fluid coupling shown in FIG. 11.

The gasket assembly 34 can be used with the prior art fluid coupling 100 as shown in FIGS. 11 and 12. More particularly, the inside diameter "g" of the sleeve 24 is equal to or slightly less than the outside diameter "r" of the coupling component 102. Thus, the sleeve 24 can be expanded slightly circumferentially such that the end 28 thereof can be urged axially onto the cylindrical surface 114 of the first coupling component 102. The sleeve 24 is urged axially onto the cylindrical surface 114 until the gasket 10 abuts the sealing bead 110 of the first coupling component 102. During this sliding movement, the sleeve 24 will be in resilient gripping engagement with the cylindrical surface 114 of the first coupling component 102. Sliding movement of the gasket assembly 34 is facilitated by portions of the ears 20 and 22 that project diametrically beyond the sleeve 24. The slight circumferential expansion of the sleeve 24 that is required for mounting onto the cylindrical surface 114 of the first coupling component 102 may cause the outer circumferential surface 18 of the gasket 10 to be spaced from the inner circumferential surface of the sleeve 24. However, the loose fit capturing of the ears 20 and 22 in the slots 30 and 32 will prevent separation of the gasket 10 from the sleeve 24. Additionally, the resilient gripping of the sleeve 24 with the first coupling component 102 will approximately center the gasket 10 in proximity to the sealing bead 110. The coupling 10 may then be connected and tightened as in the prior art, with the sealing bead 122 of the second coupling component being urged into tight sealing engagement with the gasket 10.

The coupling may periodically require disconnection. After such disconnection, it is common in the industry to replace the previously used gasket with a new gasket. Removal of the gasket 10 is greatly facilitated by the projection of the ears 20 and 22 through the slots 30 and 32 of the sleeve 24. More particularly, gloved employees working in an ultra clean environment are readily able to efficiently grip the outwardly projecting ears 20 and 22 to pull the entire gasket assembly 34 from the first coupling component 102.

Figure 13:
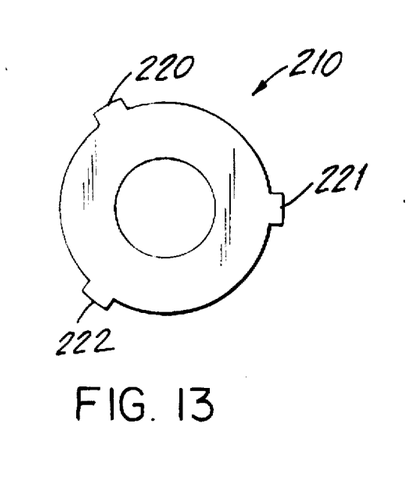
FIG. 13 is a top plan view of an alternate gasket.
Figure 14:
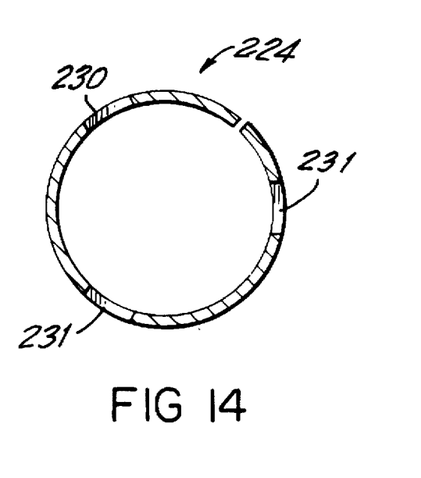
FIG. 14 is a cross-sectional view similar to FIG. 7 but showing a sleeve for use with the gasket shown in FIG. 13.

As illustrated and described herein, the gasket 10 includes two diametrically opposed ears 20 and 22, and the sleeve 24 includes two diametrically opposed slots dimensioned and disposed to loosely receive the ears 20 and 22. However, more than two ears may be provided with a corresponding number of appropriately located slots. For example, an alternate gasket 210 shown in FIG. 13 includes three outwardly projecting ears 220, 221 and 222 which are spaced from one another by approximately 120°. The gasket 210 is use with a sleeve 224 shown in FIG. 14 having three slots 230, 231 and 232 which are disposed and dimensioned to loosely receive their respective ears 220, 221 and 222.

Figure 15:
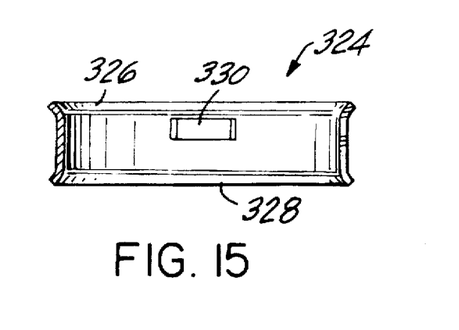
FIG. 15 is a cross-sectional view similar to FIG. 6, but showing a third embodiment of the sleeve.

The sleeve 24 described and illustrated above has interior and exterior cylindrical surfaces with uniform diameters entirely along the length of the sleeve 24. An alternate sleeve 324 as shown in FIG. 15 is functionally identical to the sleeve 24, but includes outwardly flared ends 326 and 328 to facilitate the circumferential expansion required to position the gasket 10 at an appropriate longitudinal position for the major diameter portion defined by the ears 20 and 22 to be received in the slots 330 and 332. The outwardly flared configuration also facilitates the circumferential expansion that is required to mount the sleeve 324 onto a coupling component as described and illustrated above.

Figure 16:
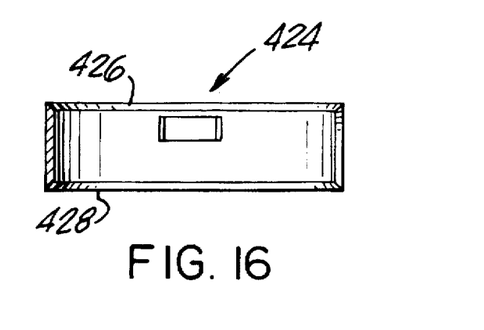
FIG. 16 is a cross-sectional view similar to FIG. 6 of a fourth embodiment of the sleeve.

FIG. 16 shows a sleeve 424 having an outer circumferential surface that is uniformly cylindrical from one end 426 to the opposed end 428. However, regions of the inner circumferential surface of the tube 424 in proximity to the ends 426 and 428 are chamfered to facilitate both the positioning of the gasket 10 and the mounting of the tube 424 onto a coupling component.

Figure 17:
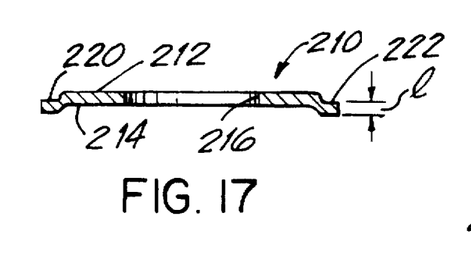
FIG. 17 is a cross-sectional view of an alternate gasket.
Figure 18:
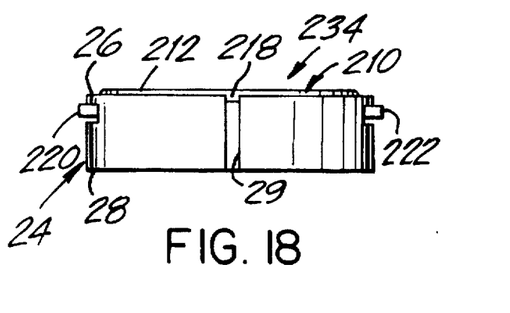
FIG. 18 is a side elevational view of a zero clearance gasket assembly comprising the gasket of FIG. 17 and the sleeve of FIGS. 4–7.
Figure 19:
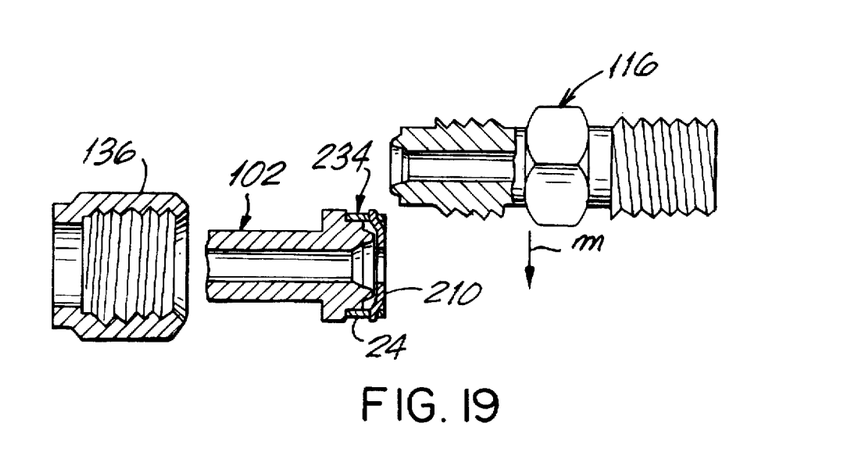
FIG. 19 is a cross-sectional view of the zero clearance gasket assembly of FIG. 18 and a fluid coupling.

An alternate gasket for use in the gasket assembly is identified generally by the numeral 210 in FIGS. 17–19. The gasket 210 includes opposed first and second sealing faces 212 and 214 which are generally planar and parallel to one another. A circular aperture 216 extends centrally through the gasket 210 between the first and second sealing faces. The gasket 210 further includes circularly generated outer arc segments 218 that are concentric with the central aperture 216. Portions of the gasket 210 described thus far are substantially identical to corresponding portions on the gasket 10 described and illustrated in greater detail above.

The gasket 210 further includes ears 220 and 222 extending outwardly beyond circular arc sections 218. The ears 220 and 222 differ from the ears on the gasket 10 in that the ears 220 and 222 are not in the same plane as remaining portions of the gasket 210. Rather, ears 220 and 222 lie in a common plane offset from the first surface 212 by a distance "l" as shown most clearly in FIG. 17. The offset "l" of the ears 220 and 222 relative to the first sealing surface 212 is selected to be equal to or greater than the distance "i" between the slots 30 and 32 of the sleeve 24 and the axial end 26 thereof.

The gasket 220 is assembled with the sleeve 24 substantially as described above. After assembly, however, the sealing face 212 of the gasket 210 is either radially aligned with the end 26 of the sleeve 24 or defines a plane spaced axially beyond the end 26 of the sleeve 24 as illustrated in FIG. 18. This construction permits true zero clearance assembly capability as illustrated most clearly in FIG. 19. More particularly, the gasket assembly 234 is mounted to the first coupling component 102 substantially as described above. However, the gasket 220 defines the leading end of the gasket assembly 234 and first coupling component 102 combination. No portion of the sleeve 24 projects axially beyond the gasket. This construction is particularly useful for situations where a fluid flow system does not permit axial movement of pipes being replaced. More particularly, the gasket assembly 234 permits the second fluid coupling component 116 to be moved transversely to the axis of the tubes, as indicated by arrow "m" in FIG. 19, and into axial alignment with the gasket 210. After axial alignment has been achieved, the nut 136 can be slid axially and then tightened to complete the connection as described above.

While the invention has been described with respect to certain preferred embodiments, it is apparent that various changes can be made without departing from the scope of the invention as defined by the appended claims.

What is claimed is:

1. A gasket assembly for a fluid coupling, said coupling having first and second components, each said component having an end face, a fluid passageway extending into said end face and through said coupling component, at least said first coupling component including a cylindrical surface of specified diameter extending from said end face, said gasket assembly comprising:

a split sleeve having opposed longitudinal ends and a cylindrically generated inner surface defining an inside diameter for resiliently gripping said cylindrical surface of said first coupling component, said sleeve further including a plurality of circumferentially extending slots, each said slot having a pair of opposed circumferentially extending edges spaced axially from said ends of said sleeve; and a metallic gasket having opposed sealing faces and a central aperture extending therethrough from one sealing face to the opposed sealing face, an outer circumferential edge including a plurality of arc segments defining a minor outside diameter for said gasket, said minor diameter being no greater than the inside diameter of said sleeve, said outer circumferential edge further including a plurality of ears projecting outwardly from said arc segments, said ears of said gasket being loosely disposed in said slots of said sleeve, and said arc segments of said outer circumferential edge being surrounded by portions of said sleeve intermediate said slots therein, whereby said gasket assembly is removably engageable on said cylindrical surface of said first coupling component for positioning said gasket relative to said first and second coupling components.

2. The gasket assembly of claim 1, wherein the ears are dimensioned to project through said slots and radially outwardly beyond said sleeve.

3. The gasket assembly of claim 1, wherein said sleeve includes two diametrically opposed slots, and wherein said gasket includes two diametrically disposed ears loosely engaged in said slots.

4. The gasket assembly of claim 1, wherein said sleeve includes three slots spaced from one another by approximately 120°, and wherein said gasket includes three ears dimensioned and disposed for loose positioning in said slots.

5. The gasket assembly of claim 1, wherein opposed ends of said sleeve are flared outwardly for facilitating circumferential expansion of said tube.

6. The gasket assembly of claim 1, wherein opposed ends of said sleeve are chamfered to facilitate circumferential expansion of said sleeve.

7. The gasket assembly of claim 1, wherein said ears are offset axially from remaining portions of said gasket by a distance at least equal to said spacing of said slots from said one end of said sleeve such that no more than one said sealing face of said gasket is disposed intermediate said ends of said sleeve.

8. The gasket assembly of claim 1, wherein said opposed sealing faces of said gasket are substantially planar and parallel to one another.

9. The gasket assembly of claim 1, wherein said slots in said sleeve define axial dimensions at least 25% greater than a thickness dimension of said gasket as measured between said opposed sealing faces.

10. The gasket assembly of claim 1, wherein each said slot defines a circumferential width at least approximately 25% greater than a corresponding circumferential width dimension for each said ear.

* * * * *